(12) United States Patent
Kimmel et al.

(10) Patent No.: US 10,940,907 B2
(45) Date of Patent: Mar. 9, 2021

(54) BICYCLE HYDRATION SYSTEM (71) Applicant: Specialized Bicycle Components, Inc., Morgan Hill, CA (US)

(72) Inventors: Keith Kimmel, Morgan Hill, CA (US); Yann Duez, Morgan Hill, CA (US); Daniel Lentz, Morgan Hill, CA (US); Brenton Haven, Morgan Hill, CA (US)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 200 days.

(21) Appl. No.: 15/992,843

(22) Filed: May 30, 2018

(65) Prior Publication Data
US 2019/0367115 A1 Dec. 5, 2019

(51) Int. Cl.
*B62J 9/20* (2020.01)
*B62K 19/40* (2006.01)
*B62K 19/34* (2006.01)
*B62K 19/36* (2006.01)
*A45F 3/20* (2006.01)
*B62K 19/32* (2006.01)
*B62K 21/12* (2006.01)
*B62K 21/02* (2006.01)

(52) U.S. Cl.
CPC ............... *B62J 9/20* (2020.02); *A45F 3/20* (2013.01); *B62K 19/32* (2013.01); *B62K 19/34* (2013.01); *B62K 19/36* (2013.01); *B62K 19/40* (2013.01); *B62K 21/02* (2013.01); *B62K 21/12* (2013.01)

(58) Field of Classification Search
CPC ............ A45F 3/20; B62K 19/32; B62K 19/34; B62K 19/36; B62K 19/40; B62K 21/02; B62K 21/12; B62K 21/00; B62J 11/00
See application file for complete search history.

(56) References Cited

U.S. PATENT DOCUMENTS

| | | | | |
|---|---|---|---|---|
| 5,158,218 | A | * 10/1992 | Wery | B67D 1/0456 222/610 |
| 5,358,142 | A | * 10/1994 | Holmes | B62J 9/22 222/1 |
| 5,788,134 | A | * 8/1998 | Matic, Jr. | B62J 11/00 224/414 |

(Continued)

*Primary Examiner* — Ruth Ilan
*Assistant Examiner* — Harold Eric Pahlck, III
(74) *Attorney, Agent, or Firm* — Michael Best & Friedrich LLP (57) ABSTRACT

A bicycle comprises a frame assembly and a hydration system. The frame assembly includes a main frame and a fork assembly pivotally coupled to the main frame. The hydration system includes a reservoir supported by the frame assembly, a collapsible bladder positioned in the reservoir, and a hose coupled to the bladder and extending through a reservoir opening. The hose enters the main frame through a frame opening and passes through an inside of the main frame above a bottom bracket. The hose exits the main frame through a front opening and enters the fork assembly through a fork opening facing toward the front opening. The fork assembly can also include a nose piece in front of the headset bearing, wherein the hose passes between headset bearing and the nose piece. The fork assembly can also include a handlebar and a riser supporting the handlebar, wherein the hose passes through the riser.

19 Claims, 8 Drawing Sheets

(56) References Cited

U.S. PATENT DOCUMENTS

| | | | |
|---|---|---|---|
| 5,851,017 A * | 12/1998 | Eden .................... | B62J 11/00 |
| | | | 280/201 |
| 6,401,997 B1 | 6/2002 | Smerdon, Jr. | |
| 6,953,135 B2 * | 10/2005 | Litton ................... | B62J 11/00 |
| | | | 224/414 |
| 7,631,784 B2 * | 12/2009 | Hollis ................... | B62J 9/22 |
| | | | 222/175 |
| 8,308,179 B2 | 11/2012 | Cote et al. | |
| 8,777,075 B2 | 7/2014 | Bretl et al. | |
| 9,452,800 B1 * | 9/2016 | Dixon ................... | B62J 9/22 |
| 9,657,727 B2 * | 5/2017 | Osborn ................. | E03B 9/20 |
| 9,919,324 B2 * | 3/2018 | Carrozza .............. | B62J 11/00 |
| 10,407,120 B2 * | 9/2019 | Seear .................... | B62K 3/04 |
| 2012/0259180 A1 * | 10/2012 | Rock .................... | B62J 11/00 |
| | | | 600/300 |
| 2017/0203809 A1 | 7/2017 | Seear | |

* cited by examiner

BICYCLE HYDRATION SYSTEM

BACKGROUND

The present invention relates to hydration system adapted to be mounted on or integrated into a bicycle.

During strenuous cycling, it is important for the rider to drink fluids to hydrate the body. Historically, bicycles include cages that support water bottles. The water bottles can be removed from the cages by the rider and commonly include a spout that facilitates drinking the water while riding. The water bottles can then be returned to the cages.

Some bicycles include hydration bladders that can be mounted on or inside the frame and include a hose that is routed from the bladder to a front part of the bicycle. One end of the hose is connected to the bladder, and the other end provides a location for the rider to drink water from the bladder.

SUMMARY

The present invention provides a bicycle comprising front and rear wheels, a frame assembly supported on the front and rear wheels, and a hydration system. The frame assembly includes a main frame and a fork assembly pivotally coupled to the main frame. The hydration system includes a substantially rigid reservoir supported by the frame assembly (e.g., behind the seat tube) and having a reservoir opening adjacent a bottom end of the reservoir, a collapsible bladder positioned in the reservoir, and a hose coupled to the bladder and extending through the reservoir opening.

In one embodiment, the main frame includes a frame opening adjacent the reservoir opening, and the hose enters the main frame through the frame opening. Preferably, the main frame includes a bottom bracket adapted to support a crank assembly, and the hose passes through an inside of the main frame above the bottom bracket. In addition, the main frame can be coupled to the fork assembly by a headset bearing, and the main frame can include a front opening adjacent the headset bearing, wherein the hose exits the main frame through the front opening.

In yet another embodiment, the fork assembly includes a fork opening facing toward the front opening, and the hose enters the fork assembly through the fork opening. Preferably, the hose has a hose width, and the fork opening has a fork opening width that is at least twice the hose width in order to allow rotation of the fork relative to the main frame. The fork assembly can also include a nose piece in front of the headset bearing, wherein the hose passes between headset bearing and the nose piece. The fork assembly can also include a handlebar and a riser supporting the handlebar, wherein the hose passes through the riser.

In another embodiment, the main frame includes a seatpost opening, and the bicycle further comprises a saddle and a seatpost member supporting the saddle and positioned at least partially into the seatpost opening. In this embodiment, the reservoir has a lower end below the seatpost opening and an upper end above the seatpost opening. Preferably, the reservoir is not coupled directly to the seatpost member.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
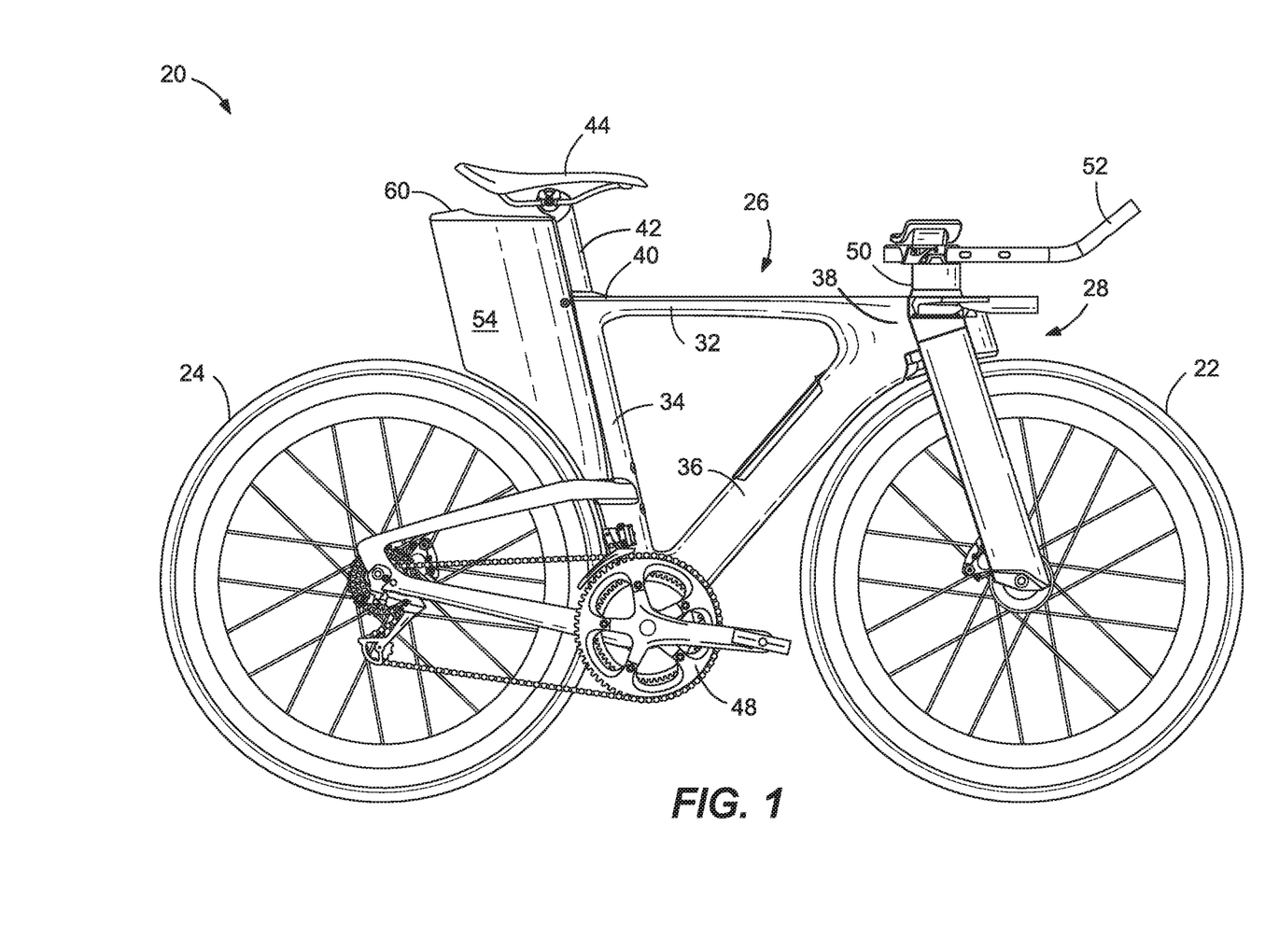
FIG. 1 is a side view of a bicycle having a hydration system embodying the present invention.
Figure 2:
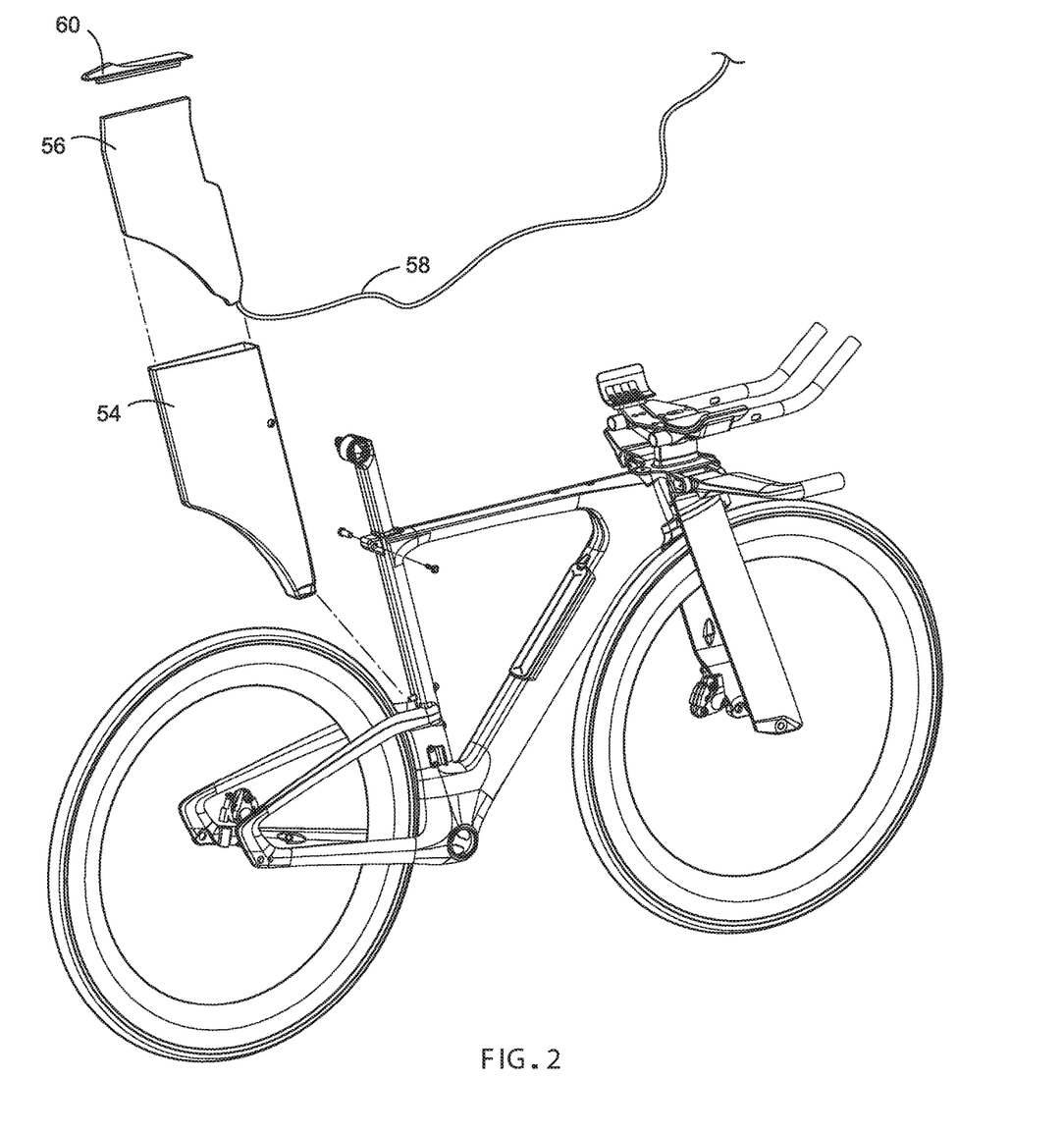
FIG. 2 is an exploded view of the bicycle of FIG. 1.

FIG. 1 illustrates a bicycle 20 having a front wheel 22, a rear wheel 24, and a frame assembly supported by the front and rear wheels 22,24. The frame assembly includes a main frame 26 and a fork assembly 28 pivotally coupled to the main frame 26 by upper and lower headset bearings 30. The illustrated main frame includes a top tube 32, a seat tube 34, a down tube 36, and a head tube 38 supporting the headset bearings 30. An upper end 40 of the seat tube 34 includes a seatpost opening dimensioned to receive a seatpost 42 for supporting a saddle 44. A bottom bracket 46 is positioned at the intersection of the seat tube 34 and the down tube 36 and is adapted to support a crankset 48, as is generally known in the art. The fork assembly 28 includes a riser 50 that supports handlebars 52.

The bicycle 20 further includes a hydration system including a reservoir 54 supported by the frame assembly, a collapsible bladder 56 positioned inside the reservoir 54, and a hose 58 coupled to the bladder 56. The illustrated reservoir 54 is mounted behind the seat tube 34 and has an aerodynamic shape that meshes with the shape of the seat tube 34. The reservoir 54 is substantially rigid so that is retains its aerodynamic shape and has a lid 60 to inhibit the entry of contaminants into the reservoir 54. In the preferred embodiment, the reservoir 54 is made of a fiber/matrix composite, such as carbon fiber-epoxy matrix.

Figure 3:
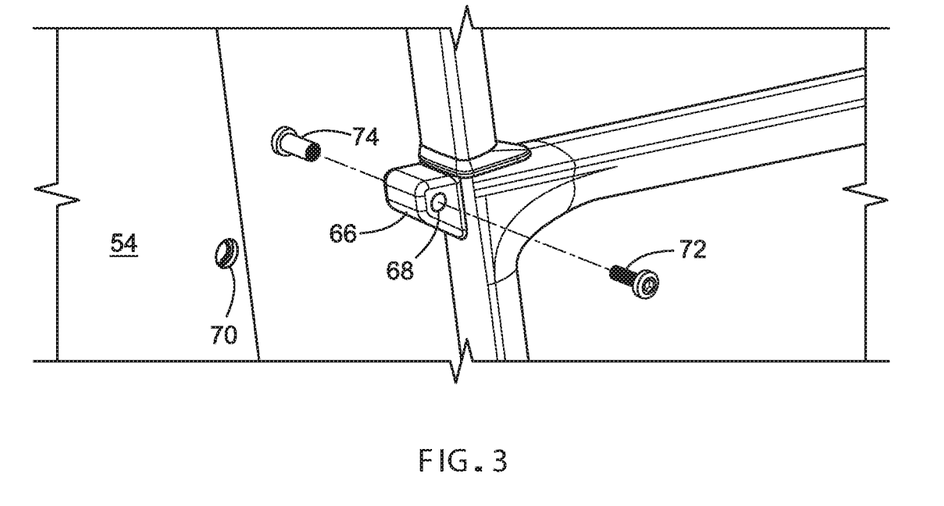
FIG. 3 is an enlarged rear perspective view of an upper mount for the hydration system.
Figure 4:
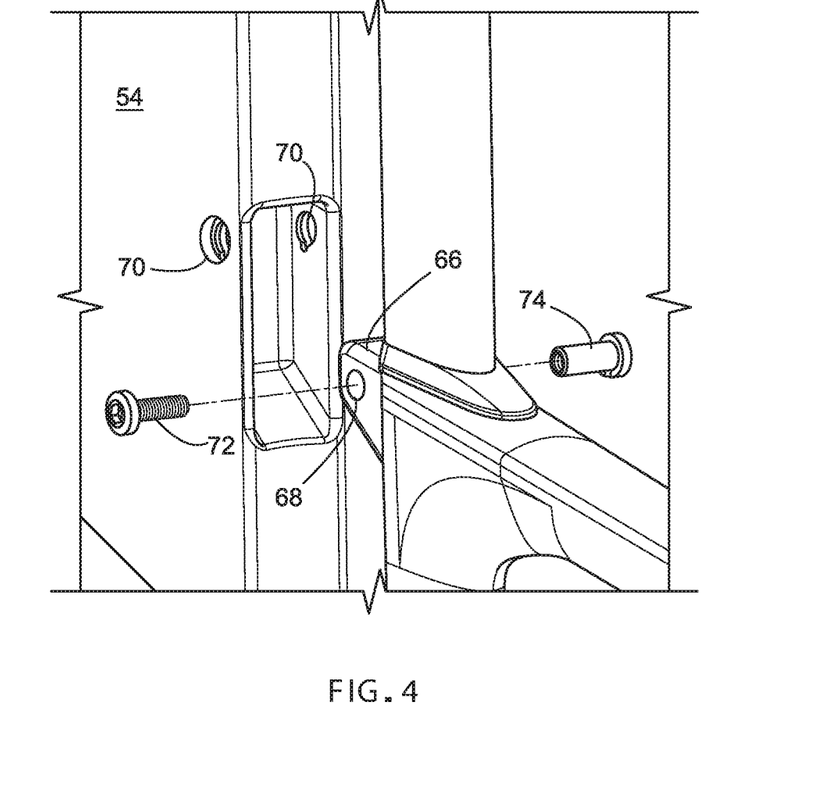
FIG. 4 is an enlarged front perspective view of the upper mount.
Figure 5:
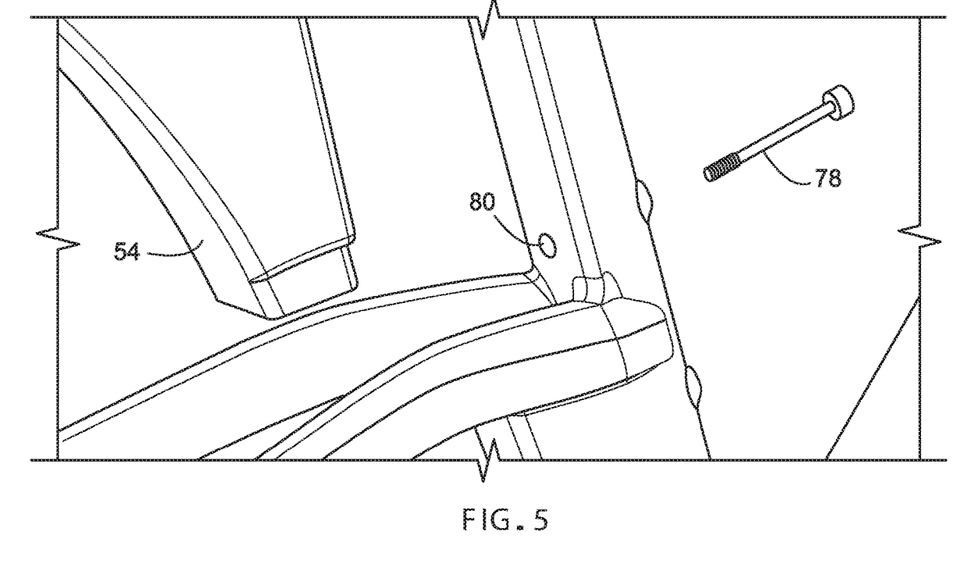
FIG. 5 is an enlarged rear perspective view of a lower mount for the hydration system.
Figure 6:
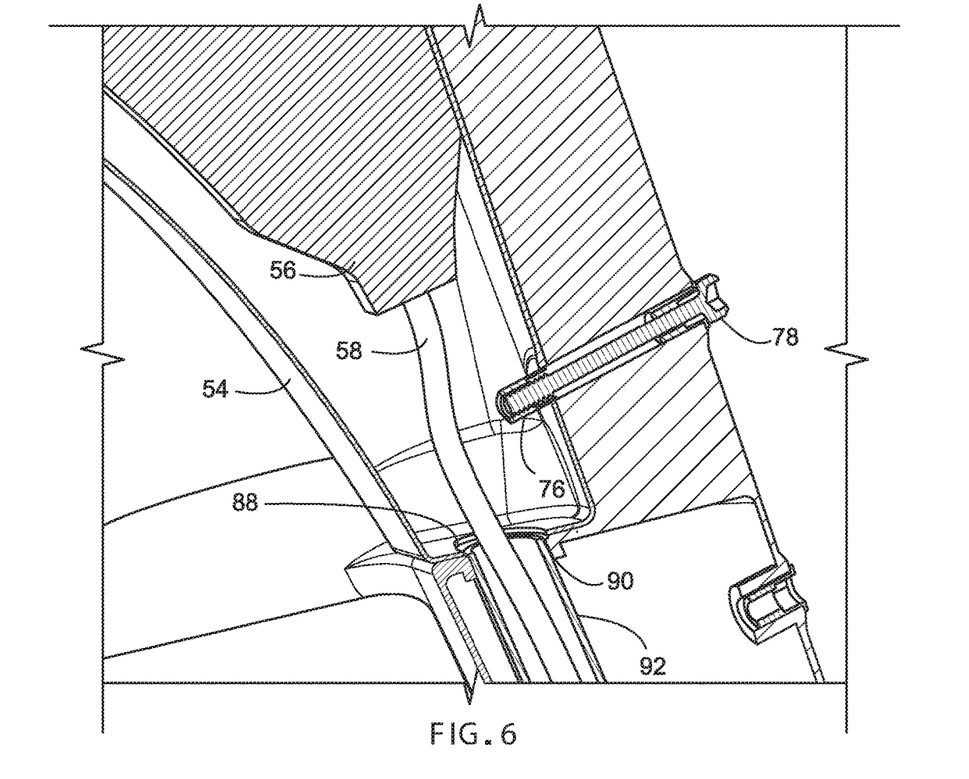
FIG. 6 is a section view of the lower mount in an assembled condition.

The reservoir 54 is secured to the seat tube 34 by and upper mount (FIGS. 3-4) and a lower mount (FIGS. 5-6). The upper mount comprises an upper boss 66 extending from a rear surface of the seat tube 34 and having a boss hole 68 that is adapted to be aligned with reservoir holes 70 in the reservoir 54. An upper bolt 72 and barrel nut 74 are dimensioned to pass through the reservoir holes 70 and into the boss hole 68 and threaded to each other to secure an upper portion of the reservoir 54 to the seat tube 34. The lower mount comprises a threaded insert 76 in the reservoir 54 and a lower bolt 78 that passes through a lower opening 80 in the seat tube 34 and into the threaded insert 76 to secure a lower portion of the reservoir 54 to the seat tube 34. It is noted that the reservoir 54 is not secured to the seatpost 42, thereby allowing adjustment to the height of the seatpost 42 and saddle 44 without affecting the reservoir 54.

Figure 7:
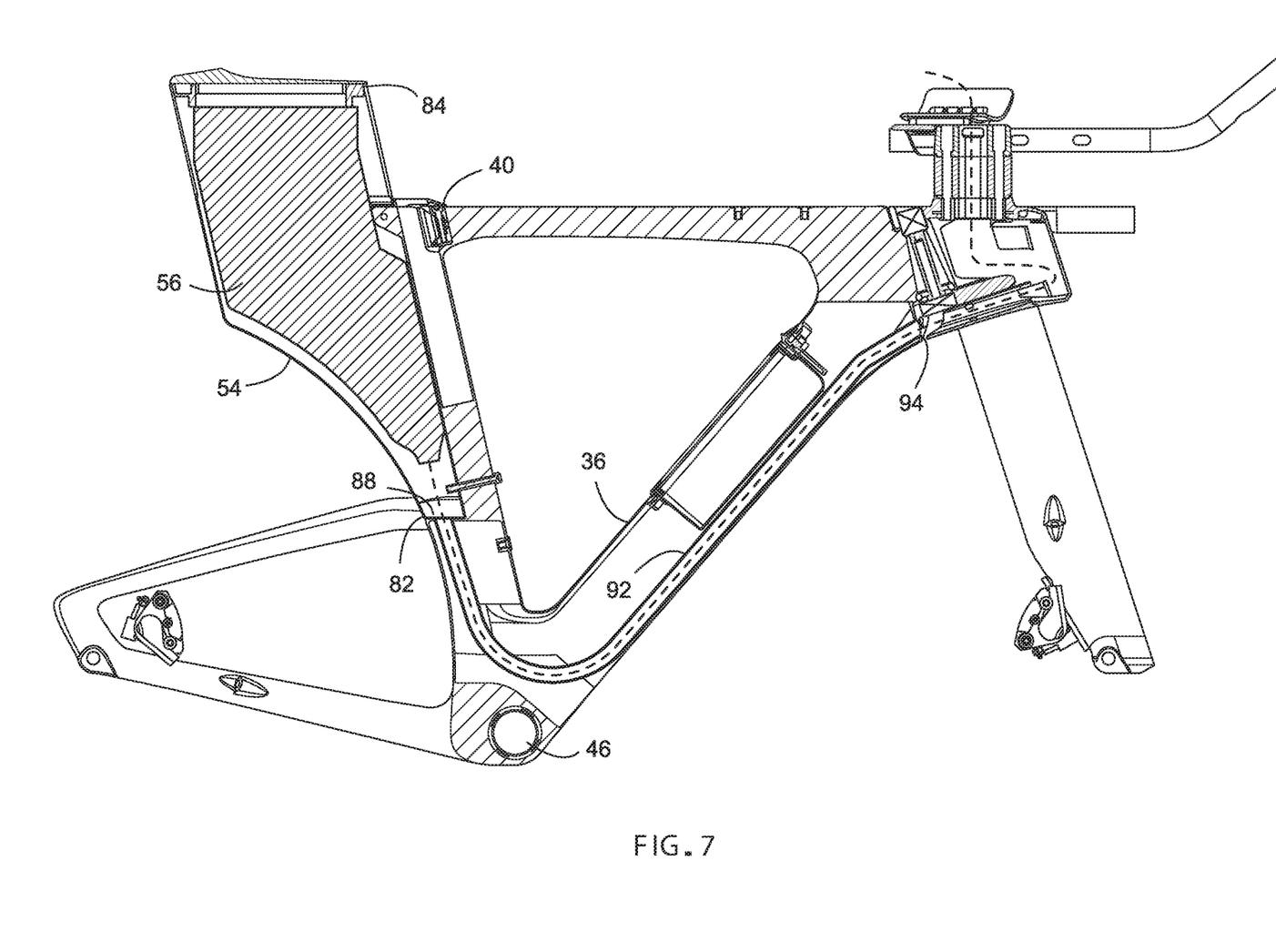
FIG. 7 is a side section view of the bicycle, showing the routing of a hydration tube.

As shown in FIG. 7, the reservoir 54 has a lower end 82 that is positioned between the height of the bottom bracket 46 and the height of the seatpost opening at the upper end 40 of the seat tube 34, and an upper end 84 positioned above the top of the seat tube 34. The height of the upper end 84 of the reservoir above the top of the seat tube can vary depending on the size of the bicycle and the height of the seat post, and in one embodiment that height is about 117 mm. Such an arrangement provides a relatively large reservoir 54 that enhances the volume of hydration fluids that can be contained by the reservoir 54.

The bladder 56 is a flexible container that is shaped to approximately conform to the inner shape of the reservoir 54. In the preferred embodiment, the bladder 56 is made of thermoplastic polyurethane. An upper end of the bladder 56 is welded to the lid 60, which open to facilitate the insertion of fluid. The lid 60 is capped to seal the inside of the bladder from the environment. A lower end of the bladder 56 includes an exit port 86 that is connected to the hose 58 to facilitate removal of fluid from the bladder 56.

The hose 58 extends from the bladder 56, through a lower opening 88 in the reservoir 54, and into a rear opening 90 in the main frame 26. The rear opening 90 provides access to an internal hydration conduit 92 in the main frame 26, which guides the hose 58 from a rear portion of the main frame 26 to a front portion of the main frame 26, as described below in more detail.

The conduit 92 extends from the rear opening 90 downward toward the bottom bracket 46. The conduit 92 then passes above the bottom bracket 46 and curves forward and upward toward the down tube 36. The conduit 92 passes through the down tube 36 and toward the lower headset bearing 30 where it terminates at a front opening 94 in the main frame 26. The front opening 94 is positioned adjacent the lower headset bearing 30, and more specifically slightly below and rearward of the lower headset bearing 30.

Figure 8:
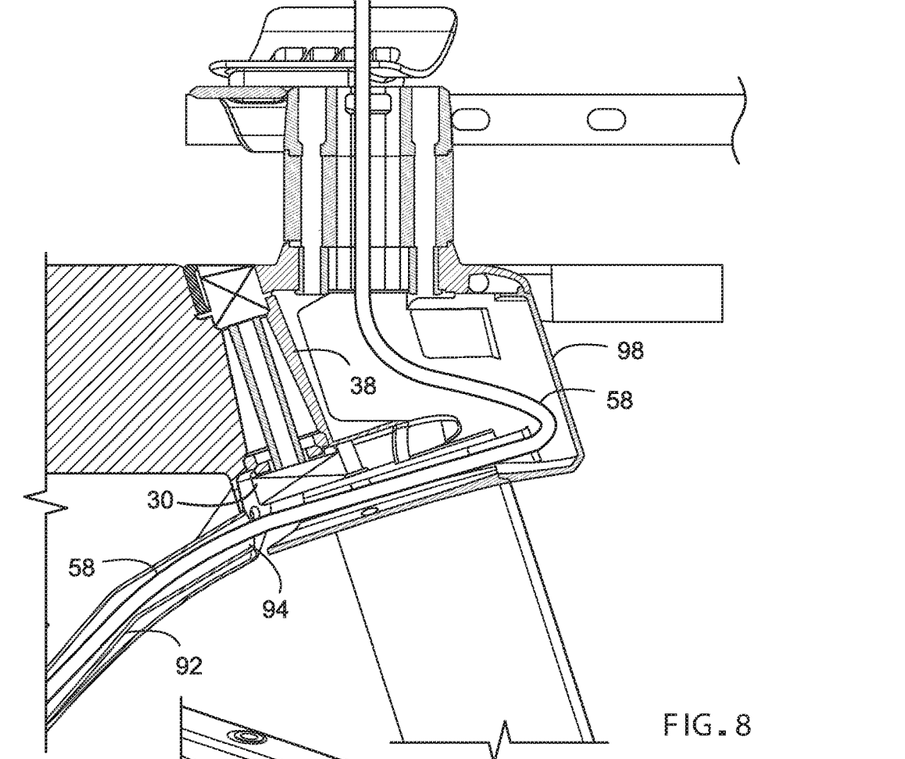
FIG. 8 is an enlarged view of a front portion of FIG. 7.
Figure 9:
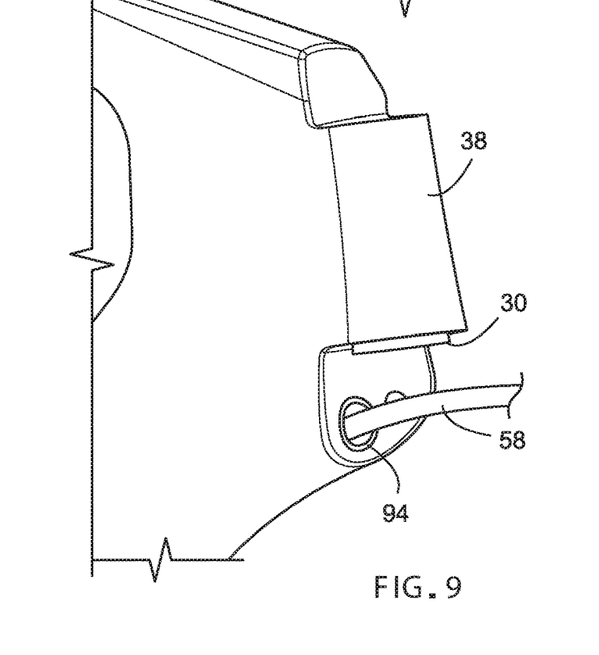
FIG. 9 is a front perspective view of a main frame of the bicycle.
Figure 10:
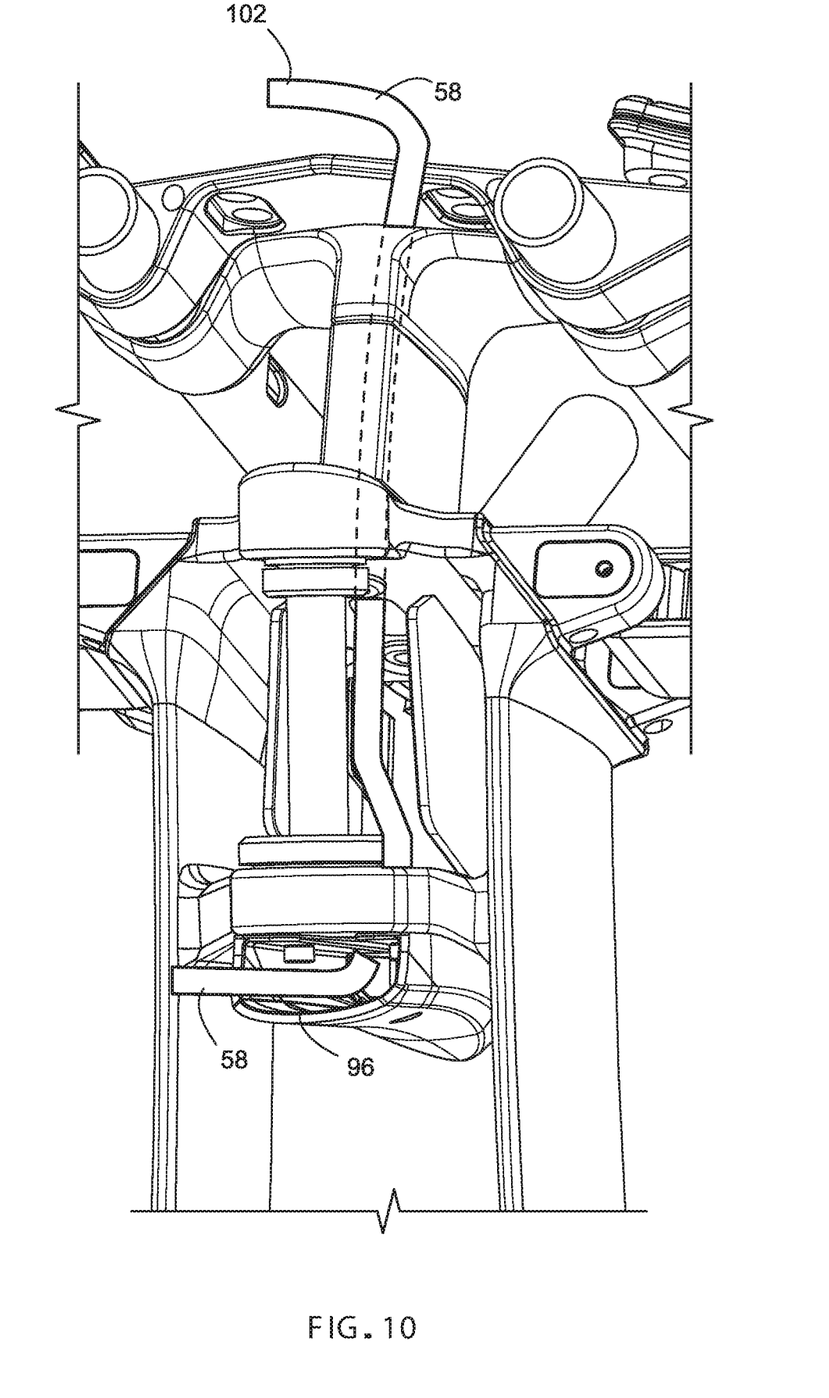
FIG. 10 is a rear view of a front fork of the bicycle in FIG. 1.
Figure 11:
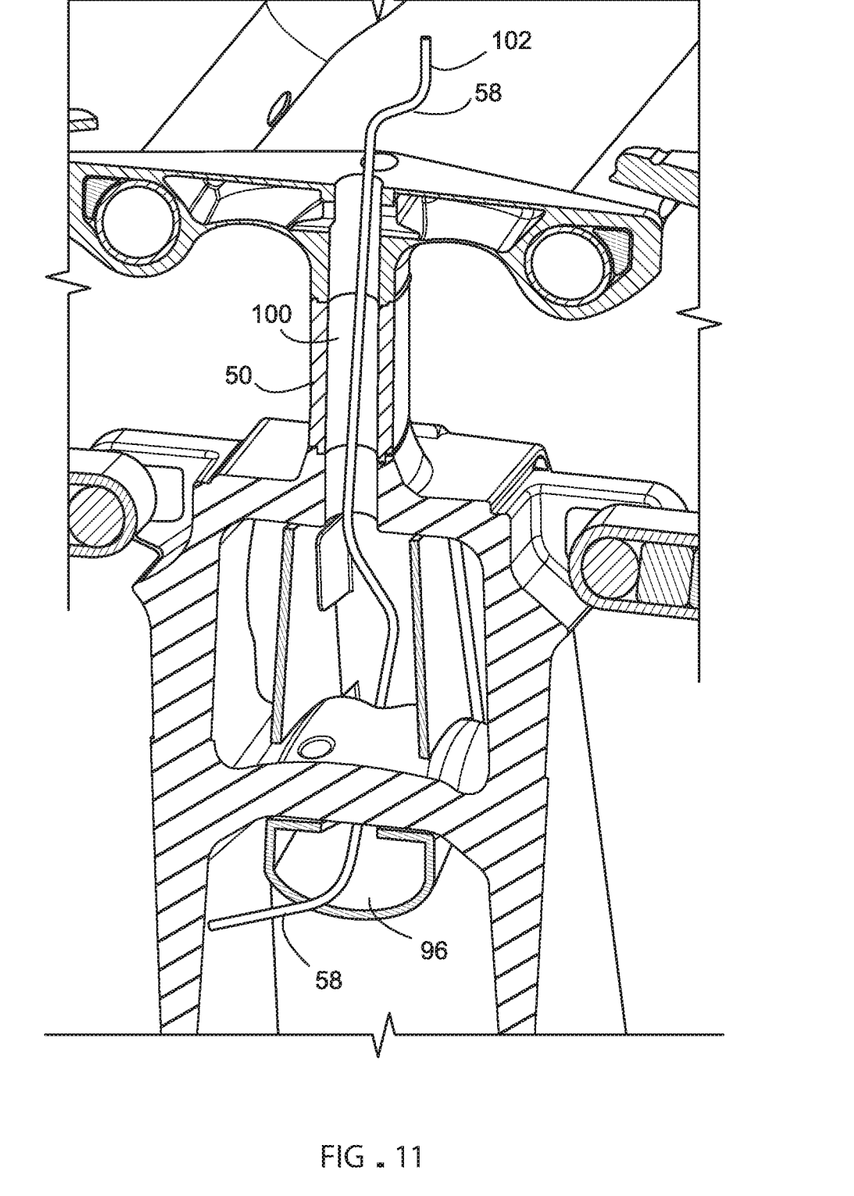
FIG. 11 is a section view taken along line 11-11 in FIG. 7.

The conduit 92 is sized to allow the hose 58 to be passed through the conduit 92, preferably from the rear opening 90 to the front opening 94. In this regard, after the hose exits the front opening 94, it enters the fork assembly 28 through a fork opening 96 in a rear of the fork assembly 28. The fork opening 96 faces toward the front opening 94 in the main frame 26 to facilitate a smooth transition of the hose 58. As best shown in FIGS. 8-10, in the space between the front opening 94 and the fork opening 96 the hose 58 is positioned substantially below the headset bearing 30. In order to accommodate rotation of the fork assembly 28 relative to the main frame 26 (i.e., for steering the bicycle), the fork opening 96 is substantially wider than the hose 58. Preferably, the fork opening 96 has a width that is more than twice the width of the hose 58.

After entering the fork opening 96, the hose 58 extends toward a front of the fork assembly 28 and upward into a space between the headset bearings 30 and a nose piece 98. The nose piece 98 is a detachable part that provides an aerodynamic and cosmetic cover to the front of the fork assembly 28.

The hose 58 continues its upward path toward an upper portion of the fork assembly 28 where it passes through the riser 50. The illustrated riser 50 is hollow and provides a substantially vertical opening 100 through which the hose 58 can pass until the hose 58 exits the fork assembly 28 at a top surface of the fork assembly 28. In that location, the free end 102 of the hose 58 can be easily accessed by the rider. In FIG. 7, the entire path of the hose 58 is shown represented by a dashed line.

Various features and advantages of the invention are set forth in the following claims.

The invention claimed is:

1. A bicycle comprising:
   a front wheel and a rear wheel;
   a frame assembly supported on the front wheel and the rear wheel, the frame assembly including a main frame and a fork assembly pivotally coupled to the main frame; and
   a hydration system including:
      a reservoir supported by the frame assembly and having a reservoir opening adjacent a bottom end of the reservoir, the reservoir being substantially rigid;
      a collapsible bladder positioned in the reservoir; and
      a hose coupled to the bladder and extending through the reservoir opening;
      wherein the main frame includes a frame opening adjacent the reservoir opening, and wherein the hose enters the main frame through the frame opening.

2. A bicycle as claimed in claim 1, wherein the reservoir is positioned behind a seat tube.

3. A bicycle as claimed in claim 1, wherein the main frame includes a bottom bracket adapted to support a crank assembly, and wherein the hose passes through an inside of the main frame above the bottom bracket.

4. A bicycle as claimed in claim 3, wherein the main frame is coupled to the fork assembly by a headset bearing, wherein the main frame includes a front opening adjacent the headset bearing, and wherein the hose exits the main frame through the front opening.

5. A bicycle as claimed in claim 1, wherein the main frame includes a seatpost opening, wherein the bicycle further comprises a saddle and a seatpost member supporting the saddle, wherein the seatpost member is positioned at least partially into the seatpost opening, and wherein the reservoir has a lower end below the seatpost opening and an upper end above the seatpost opening.

6. A bicycle as claimed in claim 5, wherein the reservoir is not coupled directly to the seatpost member.

7. A bicycle comprising:
   a front wheel and a rear wheel;
   a frame assembly supported on the front wheel and the rear wheel, the frame assembly including a main frame and a fork assembly pivotally coupled to the main frame, wherein the main frame includes a seat tube and a frame opening behind the seat tube; and
   a hydration system including a hose extending through the frame opening and into the main frame.

8. A bicycle as claimed in claim 7, wherein the main frame includes a bottom bracket adapted to support a crank assembly, and wherein the hose passes through an inside of the main frame above the bottom bracket.

9. A bicycle as claimed in claim 8, wherein the main frame is coupled to the fork assembly by a headset bearing, wherein the main frame includes a front opening adjacent the headset bearing, and wherein the hose exits the main frame through the front opening.

10. A bicycle as claimed in claim 9, wherein the fork assembly includes a fork opening facing toward the front opening, and wherein the hose enters the fork assembly through the fork opening.

11. A bicycle as claimed in claim 10, wherein the hose has a hose width and wherein the fork opening has a fork opening width that is at least twice the hose width.

12. A bicycle as claimed in claim 9, wherein the fork assembly includes a nose piece in front of the headset bearing, and wherein the hose passes between headset bearing and the nose piece.

13. A bicycle as claimed in claim 8, wherein the fork assembly includes a handlebar and a riser supporting the handlebar, and wherein the hose passes through the riser.

14. A bicycle comprising:
a front wheel and a rear wheel;
a frame assembly supported on the front wheel and the rear wheel, the frame assembly including a main frame and a fork assembly pivotally coupled to the main frame by a headset bearing, the main frame including a front opening adjacent the headset bearing; and
a hydration system including a hose extending through the main frame and out the front opening;
wherein the fork assembly includes a fork opening facing toward the front opening, and wherein the hose enters the fork assembly through the fork opening.

15. A bicycle as claimed in claim 14, wherein the main frame includes a bottom bracket adapted to support a crank assembly, and wherein the hose passes through an inside of the main frame above the bottom bracket.

16. A bicycle as claimed in claim 14, wherein the fork assembly includes a nose piece in front of the headset bearing, and wherein the hose passes between headset bearing and the nose piece.

17. A bicycle as claimed in claim 14, wherein the fork assembly includes a handlebar and a riser supporting the handlebar, and wherein the hose passes through the riser.

18. A bicycle as claimed in claim 15, wherein the hose has a hose width and wherein the fork opening has a rear opening width that is at least twice the hose width.

19. The bicycle as claimed in claim 1, wherein the frame assembly includes a seat tube defining a first axis, wherein the reservoir opening and the frame opening are aligned along a second axis that is parallel to the first axis.

* * * * *